(12) United States Patent
Qin et al.

(10) Patent No.: US 11,918,137 B2
(45) Date of Patent: *Mar. 5, 2024

(54) COOKING APPLIANCE

(71) Applicant: Instant Brands Inc., Kanata (CA)

(72) Inventors: Yi Qin, Ottawa (CA); Yok Chong Chi, Ottawa (CA); Jiwei Wang, Ottawa (CA)

(73) Assignee: Instant Brands Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,781

(22) Filed: Mar. 17, 2023

(65) Prior Publication Data

US 2023/0218103 A1  Jul. 13, 2023

Related U.S. Application Data

(63) Continuation of application No. 17/582,826, filed on Jan. 24, 2022, now Pat. No. 11,659,951, which is a (Continued)

(30) Foreign Application Priority Data

Oct. 24, 2018 (CN) .......................... 201811247107.0
Oct. 30, 2018 (CN) .......................... 201811276097.3

(51) Int. Cl.
*A47J 37/06* (2006.01)
*A47J 27/08* (2006.01)
*A47J 45/06* (2006.01)

(52) U.S. Cl.
CPC ........... *A47J 27/0804* (2013.01); *A47J 45/06* (2013.01)

(58) Field of Classification Search
CPC .... A47J 27/0804; A47J 27/08; A47J 27/0806; A47J 27/09; A47J 27/0815; A47J 45/06; A47J 36/06; A47J 36/10; B65D 2525/284
(Continued)

(56) References Cited

U.S. PATENT DOCUMENTS

| 11,259,664 | B2 | 3/2022 | Qin et al. | |
| 11,659,951 | B2 * | 5/2023 | Qin ...................... | A47J 27/0804 99/357 |

(Continued)

FOREIGN PATENT DOCUMENTS

| CN | 202287758 | | 7/2012 | |
| CN | 204260618 | * | 4/2015 | .............. A47J 47/16 |

*Primary Examiner* — John K Fristoe, Jr.
*Assistant Examiner* — Elizabeth J Volz
(74) *Attorney, Agent, or Firm* — Crowell & Moring LLP

(57) ABSTRACT

A cooking appliance is provided. The cooking appliance comprises a cooker body for receiving food and a lid for covering the cooker body. The cooking appliance has a front side for facilitating cooking operations and a rear side spaced apart from the front side. The cooker body comprises at least one latch slot disposed on an inclined rear side of the cooker body. The lid comprises at least one latch bar disposed on a periphery thereof and extending outwardly therefrom. When the lid is detached from the cooker body, the latch bar is operable to be inserted into the corresponding latch slot to secure the lid at the inclined rear side of the cooker body, allowing a user to secure the lid to the latch slot without reaching a rear side of the cooker body by hand, and to retrieve the food without accidentally contacting the lid.

20 Claims, 13 Drawing Sheets

Related U.S. Application Data continuation of application No. 16/661,248, filed on Oct. 23, 2019, now Pat. No. 11,259,664.

(58) Field of Classification Search
USPC .................. 220/315, 212.5, 573.1; 99/357
See application file for complete search history.

(56) References Cited

U.S. PATENT DOCUMENTS

2013/0255509 A1  10/2013  He et al.
2013/0306638 A1  11/2013  Ye et al.

\* cited by examiner

COOKING APPLIANCE

CROSS REFERENCE TO RELATED APPLICATIONS

This application is a continuation of U.S. Non-Provisional application Ser. No. 17/582,826, filed on Jan. 24, 2022, pending, which is a continuation of U.S. Non-Provisional application Ser. No. 16/661,248, filed on Oct. 23, 2019, now U.S. Pat. No. 11,259,664, which claims priority to Chinese Patent Application 201811247107.0, filed Oct. 24, 2018, and Chinese Patent Application 201811276097.3, filed Oct. 30, 2018, all of which are hereby incorporated by reference in their entireties.

TECHNICAL FIELD OF THE INVENTION

The present invention relates to a cooking appliance.

BACKGROUND OF THE INVENTION

A cooking appliance, for instance an electric pressure cooker, generally comprises a lid and a cooker body, wherein the lid covers the cooker body to form a cooking chamber for cooking food. The lid needs to be opened from time to time either during the cooking process, to add new ingredients into the cooking chamber, or when retrieving the cooked food after cooking is completed. At such times, the lid is still quite hot, and carries an amount of scalding water and/or steam thereon. Where the cooking appliance has an integrated lid, i.e., the lid is hingedly connected to the cooker body, the lid can be flipped open and rotated upwards about the hinge connection for placement near a side of the cooker body. However, for a cooker having a lid that is separable from the cooker body, the lid, once opened and detached from the cooker body, needs to be placed at a different location, and needs to be handled with care to avoid scald injuries.

Therefore, there is a need for improvements to the current cooking appliances.

SUMMARY OF THE INVENTION

The present invention provides a cooking appliance that allows convenient and safe placement of a lid thereof.

In accordance with one aspect of the present disclosure, there is provided a cooking appliance, comprising a cooker body for receiving food to be cooked; and a lid for covering the cooker body; wherein the cooking appliance has a front side for facilitating cooking operations and a rear side spaced apart from the front side; wherein the cooker body comprises at least one latch slot disposed on an inclined rear side of the cooker body; wherein the lid comprises at least one latch bar disposed on a periphery thereof and extending outwardly therefrom; wherein when the lid is detached from the cooker body, the at least one latch bar is operable to be inserted into the at least one latch slot, so that the lid is secured at the inclined rear side of the cooker body, thereby allowing a user to secure the lid to the at least one latch slot without reaching a rear side of the cooker body by hand, and to retrieve the cooked food without accidentally contacting the lid.

In accordance with some embodiments of the present disclosure, the at least one latch bar has a width in a circumferential direction of the lid; wherein in the circumferential direction, a front side of the latch bar is positioned to be lower than a rear side of the latch bar when the lid is horizontally oriented, so that when the at least one latch bar is inserted into the at least one latch slot, a front portion of the lid is tilted rearwardly by a predetermined angle, thereby allowing a user to avoid accidentally contacting the front portion of the lid when operating the cooking appliance at the front side thereof.

In accordance with some embodiments of the present disclosure, the at least one latch slot has width in a circumferential direction of the cooker body, wherein in the circumferential direction, a front side of the latch slot is positioned to be further away from a center of the cooker body than a rear side of the latch slot, so that when the at least one latch bar is inserted into the at least one latch slot, a front portion of the lid is tilted rearwardly by a predetermined angle, thereby allowing a user to avoid accidentally contacting the lid when operating the cooking appliance at the front side thereof.

In accordance with some embodiments of the present disclosure, a central line of the at least one latch bar is positioned in front of a center of the lid, so that when the at least one latch bar is inserted into the at least one latch slot, the lid is secured towards a rear side of the cooker body, thereby allowing a user to avoid accidentally contacting the lid when operating the cooking appliance at the front side thereof.

In accordance with some embodiments of the present disclosure, the at least one latch slot is constructed and arranged to gradually extend in an inclined rearward direction from a lower side of the latch slot to an upper side thereof, so that when the at least one latch bar is inserted into the at least one latch slot, the lid is rearwardly inclined away from the cooker body, thereby allowing a user to avoid accidentally contacting the lid when operating the cooking appliance at the front side thereof.

In accordance with some embodiments of the present disclosure, the at least one latch slot comprises a pair of latch slots disposed on a left side and a right side of the cooker body, respectively, wherein the at least one latch bar comprises a pair of latch bars disposed on a left side and a right side of the lid, respectively, so as to allow left-handed insertion operation of the lid and right-handed insertion operation of the lid, respectively.

In accordance with some embodiments of the present disclosure, the cooker body comprises an inner pot receivable therein, the inner pot comprising two pot handles disposed on opposing sides of the inner pot for carrying the inner pot, wherein the left-and-right pair of latch slots are disposed near respective pot handles without hindrance to removal of the inner pot from the cooker body.

In accordance with some embodiments of the present disclosure, the cooker body comprises a base for supporting the cooker body, an exterior shell enclosing the base, a cover board covering the exterior shell from above, and an inner pot receivable within the cover board, wherein a guiding gutter is disposed on the cover board near the inner pot, and wherein the at least one latch slot is located outside the guiding gutter and being elevated from the guiding gutter.

In accordance with some embodiments of the present disclosure, the lid comprises an upper lid portion and a lower lid portion, wherein the at least one latch bar is integrally formed with the upper lid portion, wherein the at least one latch bar comprises a hollow portion, and wherein one or more reinforcing ribs are disposed within the hollow portion.

In accordance with some embodiments of the present disclosure, the lower lid portion comprises an opening-stop mechanism disposed thereon, the opening-stop device being disposed near a periphery rim of the lower lid portion and extending outwardly therefrom, wherein the cooker body comprises a stopper groove disposed thereon, and wherein the opening-stop mechanism is operable to be pressed into the stopper groove to prevent the lid from rotating relative to the cooker body.

In accordance with some embodiments of the present disclosure, the upper lid portion comprises a main lid body and a removable cover, wherein the main lid body comprises a through opening portion disposed near a center thereof, wherein the removable cover is detachably secured to the opening portion, and wherein the removable cover comprises a handle portion formed near a front periphery of the removable cover.

In accordance with some embodiments of the present disclosure, the cooking appliance is an electric pressure cooker, wherein the lid is constructed and arranged to rotate relative to the cooker body between a lid lock position and a lid open position, and wherein the at least one latch bar is disposed at a suitable position on the lid, so that when the lid is at the lid open position, the at least one latch bar is substantially aligned with the corresponding at least one latch slot disposed on the cooker body.

It is to be understood that, the aforementioned general description and the detailed description that follows are exemplary and explanatory, and are not limiting or exhaustive as to the embodiments of the present invention.

Figure 1:
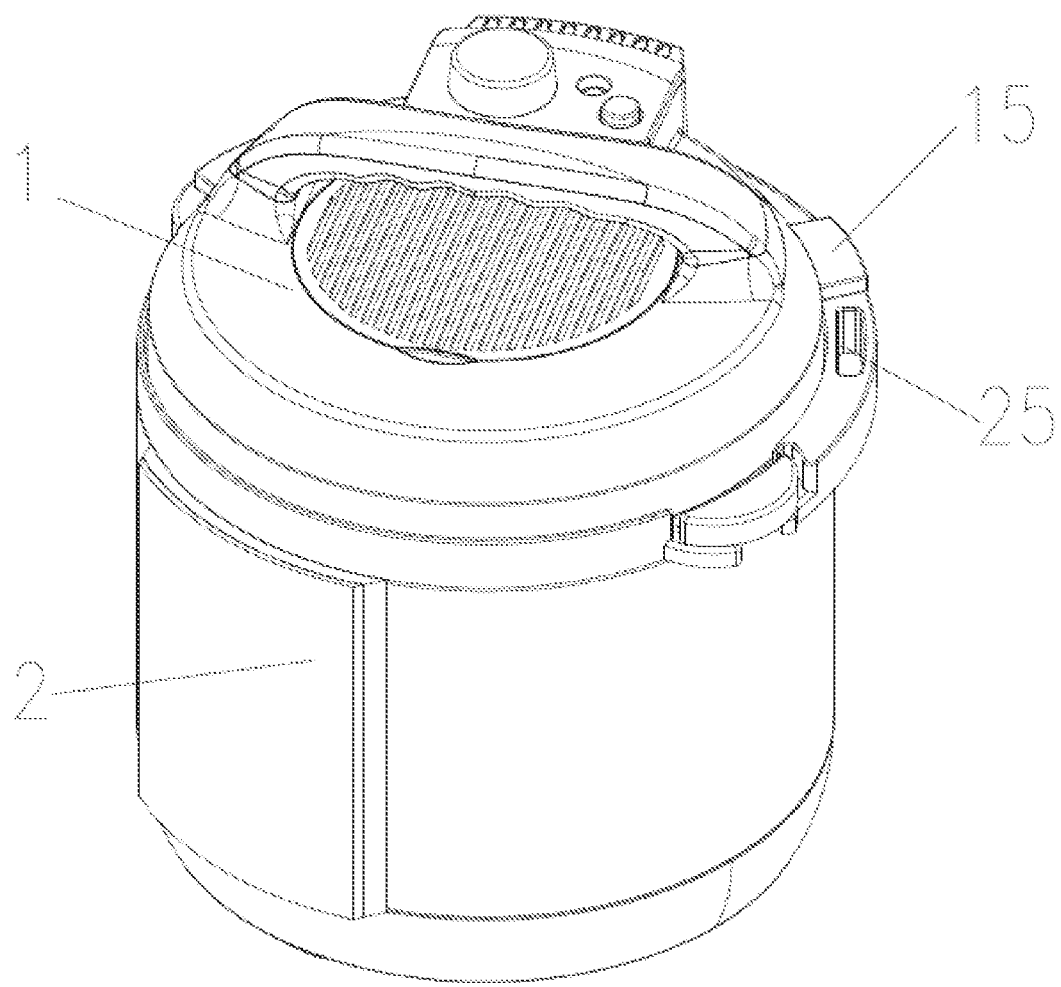
FIG. 1 is a perspective view illustrating a cooking appliance in accordance with an example embodiment of the present disclosure.

REFERENCE NUMERALS 1 lid
10 lid tooth
11 pressure-limiting value
12 mounting seat
120 sliding member
13 lid handle
14 opening-stop mechanism
15, 15', 45 latch bar
150 reinforcing rib
151' front side
152' rear side
16 upper lid portion
160 main lid body
161 removable cover
162 handle portion
17 lower lid portion
2 cooker body
21 inner pot
210 pot handle
22 heat insulation cover
220 cooker tooth
23 exterior shell
24 cover board
240 sliding seat
241 sliding groove, guiding gutter
243 water collection box
244 drain pore
25, 25' latch slot
251' front side
252' rear side
26 cooker handle
27 display device

DETAILED DESCRIPTION

Exemplary embodiments will be described in detail herein, examples of which are illustrated in the accompanying drawings. When the following description refers to the accompanying drawings, unless otherwise indicated, the same numbers in different drawings represent the same or similar elements. The embodiments described in the following exemplary embodiments do not represent all embodiments consistent with the present invention. Instead, they are merely examples of devices, systems, equipment and methods consistent with some aspects of the present disclosure as detailed in the appended claims.

Figure 4:
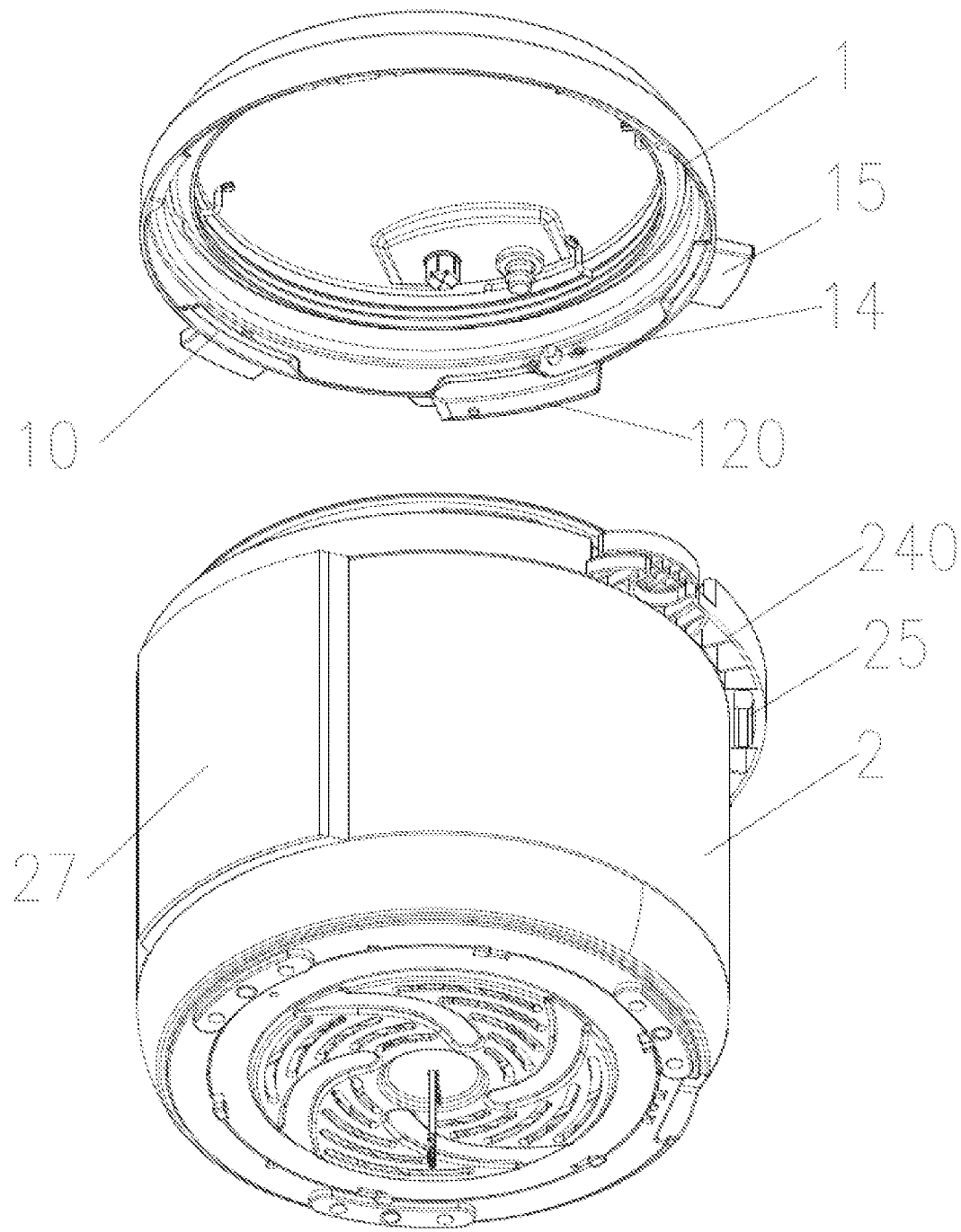
FIG. 4 is another perspective view of the cooking appliance of FIG. 1 having the lid and the cooker body shown in separation.

Referring to FIGS. 1 and 4, a cooking appliance according to an example embodiment of the present disclosure is illustrated as an electric pressure cooker, comprising a lid 1 and a cooker body 2, the lid 1 being constructed and arranged for covering the cooker body 2. The cooker body 2 comprises an inner pot 21 and a pot body for housing the inner pot 21, the pot body comprising a base (not numbered) for supporting the cooker body 2, a heat insulation cover 22, an exterior shell 23 enclosing the base, a cover board 24 covering the exterior shell 23 from above, and a heating element (not shown). The inner pot 21 is received within the heat insulation cover 22, wherein the cover board 24, the exterior shell 23, and the base together form a cavity for housing the heat insulation cover 22. The inner pot 21 and the heat insulation cover 22 may be made of stainless steel. Conventional heating plate or solenoid disc can be adopted to construct the heating element, wherein the heating element is disposed substantially between a bottom portion of the inner pot 21 and a bottom portion of the heat insulation cover 22, for heating the inner pot 21. In use, the inner pot 21 and the lid 1 form an enclosed cooking chamber therebetween for pressurized cooking. The heat insulation cover 22 comprises one or more cooker teeth 220 disposed along a top rim thereof, the lid 1 comprises one or more lid teeth 10 formed thereon, wherein the lid teeth 10 and the cooker teeth 220 are constructed and arranged to mutually latch to ensure that the lid 1 is locked onto the cooker body 2 during cooking. The lid 1 comprises a pressure-limiting valve 11 disposed thereon, wherein the pressure-limiting valve 11 is operable to be opened upon completion of the cooking process to discharge air from the cooking chamber, so that the temperature and pressure in the cooking chamber can be quickly lowered, thereby allowing the lid to be opened safely in a short time.

Figure 5:
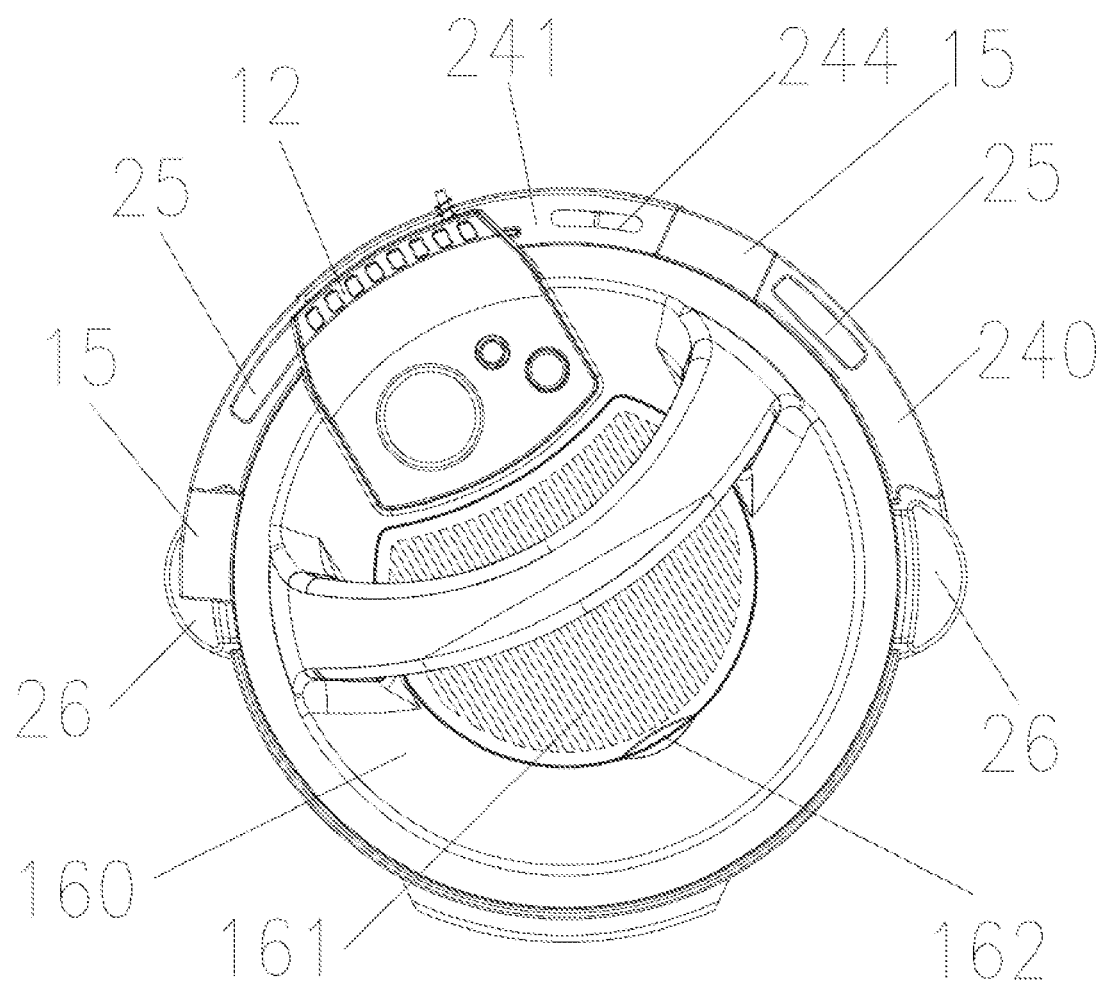
FIG. 5 is a top view of the cooking appliance of FIG. 1.

The lid 1 and cooker body 2 of the cooking appliance in accordance with example embodiments of the present disclosure are constructed and arranged to have a separable configuration, wherein the lid 1 can be completely removed or detached from the cooker body 2. With reference to FIG. 5, a sliding seat 240 is disposed near a top portion of a rear sidewall of the cover board 24, wherein a sliding groove 241 is disposed on the sliding seat 240. A mounting seat 12 is disposed at a rear portion of the lid 1, wherein a sliding member 120 is disposed at a lower portion of the mounting seat 12 and extends downwardly therefrom, and wherein the sliding member 120 is constructed and arranged for insertion into the sliding groove 241 and gliding movement therein. The sliding groove 241 is substantially arc shaped, and has stopper walls disposed at two ends of the sliding groove 241 for preventing the sliding member 120 from moving outside of the sliding groove 241. By way of the mutual engagement between the sliding member 120 and the sliding groove 241, the lid 1 can rotate relative to the cooker body 2 between a lid lock position and a lid open position. When the lid is at the lid open position, a user can grasp a lid handle 13 disposed on top of the lid 1 and lift the lid 1; whereas when the lid is at the lid lock position, the lid teeth 10 and the cooker teeth 220 are mutually latched such that the lid 1 cannot be opened.

Figure 7:
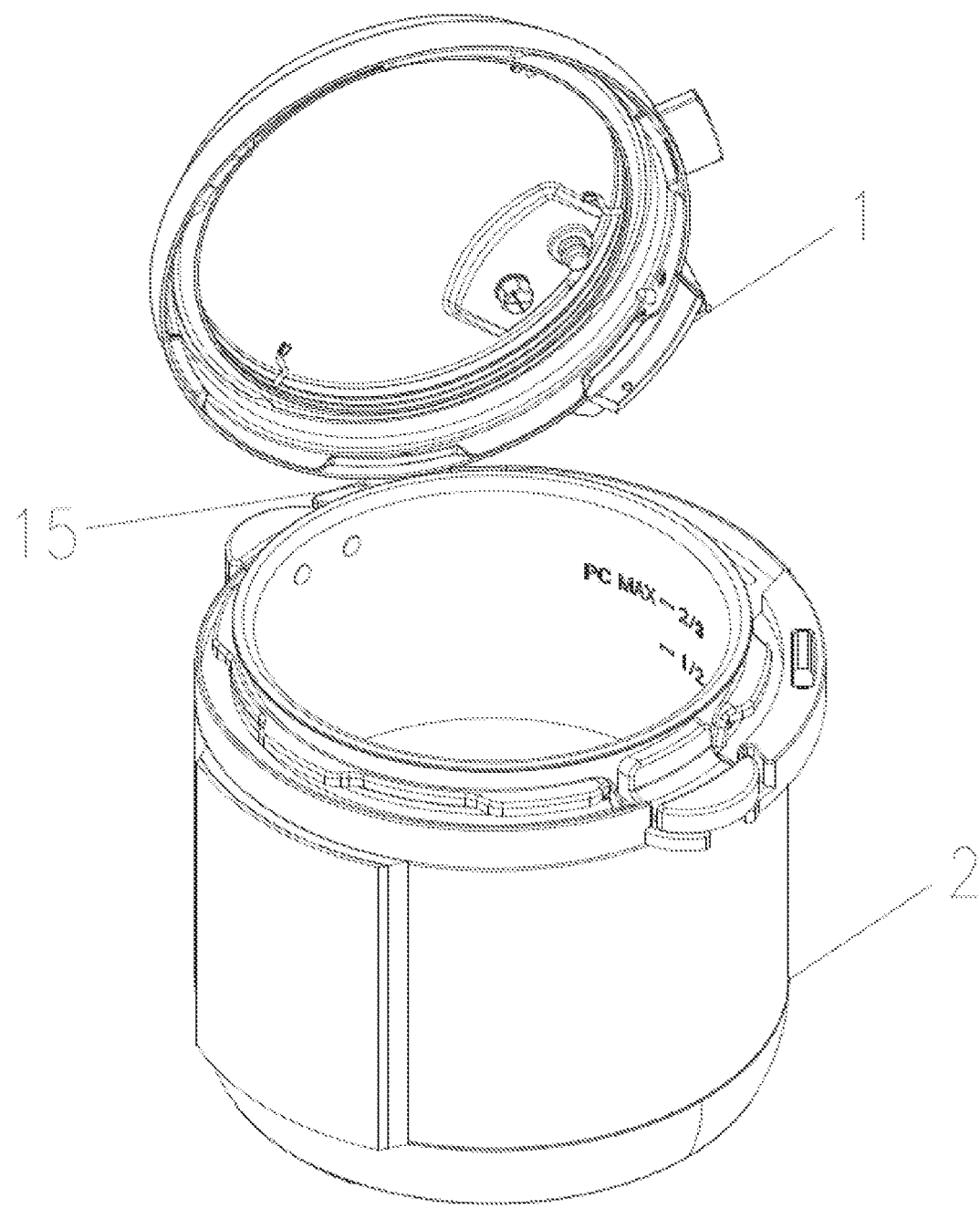
FIG. 7 is a perspective view of the cooking appliance of FIG. 1 with the lid secured to a side of the cooker body.

In a prior art electric pressure cooker having separable lid and cooker body, after the lid is lifted from the cooker body, the lid needs to be separately placed on the countertop. During such lid placement operation, the countertop may easily become crowded and/or messy, and a user may easily be scalded. According to some embodiments of the present disclosure, the cooking appliance has a front side for facilitating cooking operations and a rear side spaced apart from the front side; wherein the cooker body 2 comprises at least one latch slot 25 disposed on an inclined rear side (i.e., a rear right side or a rear left side) of the cooker body 2 and extending in a substantially vertical or upward direction. The lid 1 comprises at least one latch bar 15 disposed on a rear portion of a periphery of the lid 1 and extending outwardly and substantially horizontally therefrom when the lid is horizontally oriented. With reference to FIG. 7, when the lid 1 is detached from the cooker body 2, the at least one latch bar 15 is operable to be inserted into the at least one latch slot 25, so that the lid 1 is secured at the inclined rear side of the cooker body 2, thereby allowing a user to secure the lid 1 to the at least one latch slot 25 without reaching to a rear side of the cooker body 2 by hand, and to take the cooked food out of the cooker body 2 without accidentally contacting the lid 1.

Referring to FIG. 5, in some embodiments, the at least one latch slot 25 is disposed on the cover board 24 and formed on the sliding seat 240. In order to accommodate the needs of those users who prefer left-handed operations, two latch slots 25 are provided on the cover board 24 and are symmetrically disposed. The two latch slots 25 are located near two ends of the sliding seat 240, respectively, and are positioned near respective ends of the sliding groove 241. A left-and-right pair of latch bars 15 are correspondingly disposed on the lid 1, so that the latch slot 25 on the right side will facilitate right-handed operations of the lid 1, whereas the latch slot 25 on the left side will facilitate left-handed operations of the lid 1.

As noted above, the lid 1 is operable to rotate relative to the cooker body 2 between a lid lock position and a lid open position. In some embodiments, when the lid 1 is at the lid open position, the at least one latch bar 15 may not be positioned to substantially align with the corresponding at least one latch slot 25 of the cooker body 2. As an improvement, in some example embodiments, the at least one latch bar 15 may be provided at a suitable location on the lid 1, such that when the lid 1 is at the lid open position, the at least one latch bar 15 is substantially aligned with the corresponding at least one latch slot 25 disposed on the cooker body 2, thereby facilitating the placement operation of the lid 1.

Figure 8:
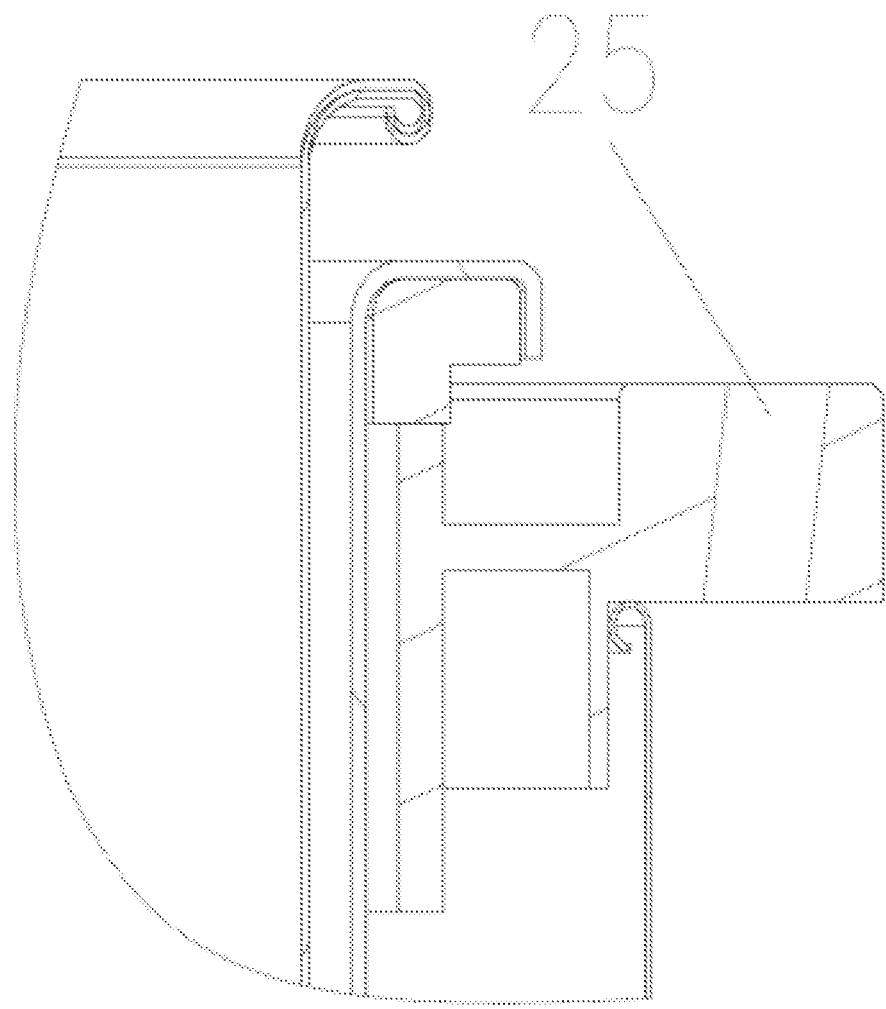
FIG. 8 is a partial sectional view of the cooker body of the cooking appliance of FIG. 1.

It is to be understood that, in some embodiments, the inner pot 21 may comprise two pot handles 210 disposed at opposing sides of the inner pot 21, respectively, for carrying the inner pot 21, wherein the two latch slots 25 are disposed in proximity to the corresponding pot handles 210, respectively, without interfering with the removal of the inner pot 21 from the cooker body 2. As such, the placement operation of the lid 1 will not hinder the handling of the inner pot 21. With reference to FIG. 8, in some embodiments, in order to support the lid 1 on the cooker body 2 in a rearwardly/outwardly inclined substantially upward orientation, the at least one latch slot 25 is configured to be slightly slanted or inclined by an angle. For example, the at least one latch slot 25 can be constructed and arranged to gradually tilt away from a center of the cooker body 2 along a substantial upward direction, so that when the at least one latch bar 15 is inserted into the at least one latch slot, the lid 1 is tilted outwardly away from the cooker body 2, thereby avoiding interference with the space taken by the inner pot 21. Such configuration also allows handling of food and/or the inner pot 21 without being accidentally scalded by the lid 1. Other designs or implementations are possible, as long as they allow normal handling of the inner pot 21, i.e., the placement of the lid 1 on a rear portion of the cooker body 2 may not hinder the insertion and/or removal of the inner pot 21. For example, as an alternative, the at least one latch slot 25 can be configured to extend vertically, whereas the at least one latch bar 15 is configured to extend outwardly from the lid and incline upwardly, so that when the lid 1 is secured to the at least one latch slot 25 by insertion placement, the lid 1 is oriented in a rearwardly inclined manner relative to the cooker body 2.

Figure 2:
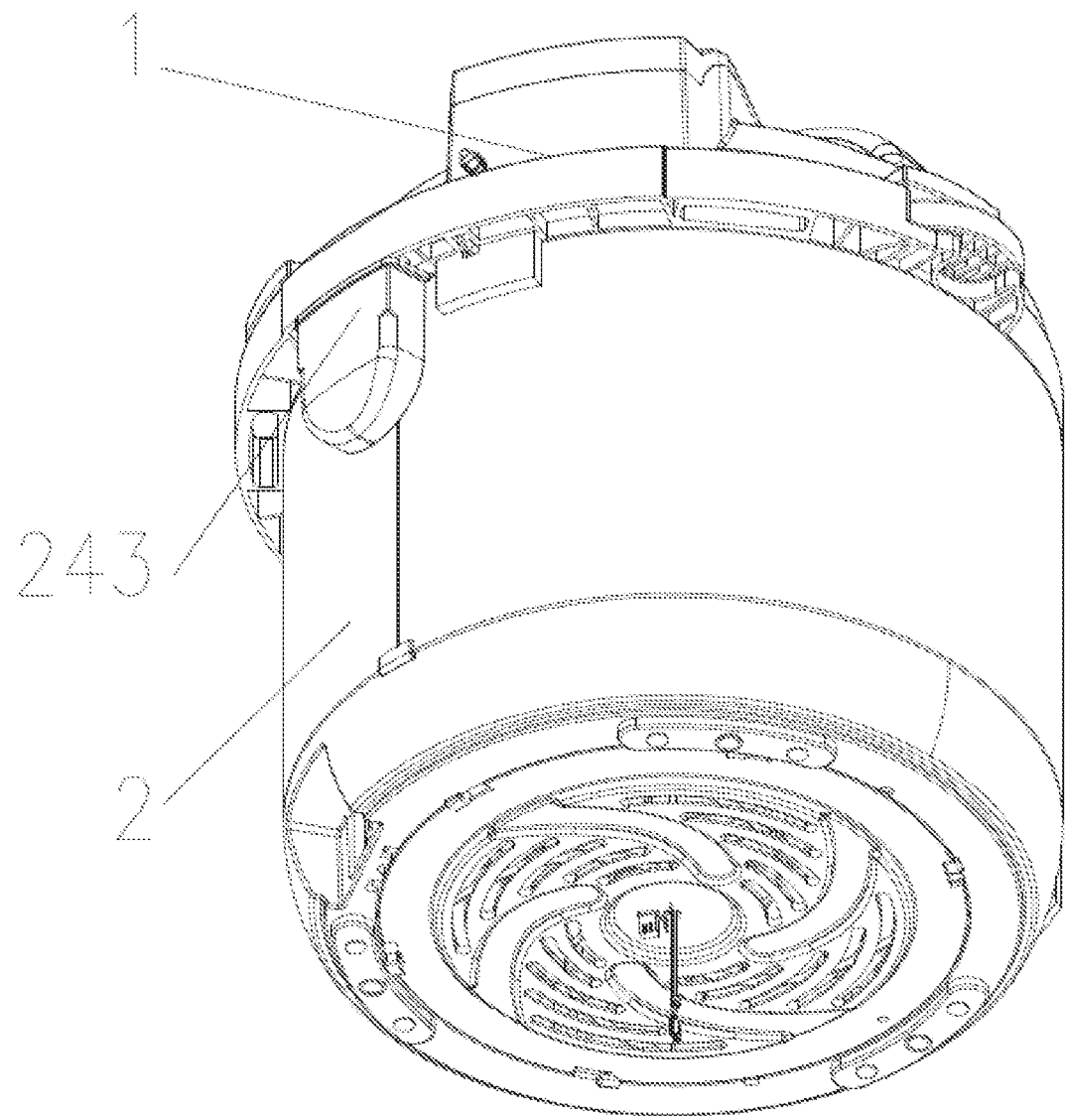
FIG. 2 is another perspective view of the cooking appliance of FIG. 1.

Further, in some embodiments, a water collection box 243 (see FIG. 2) is disposed under the sliding seat 240, preferably the water collection box 243 being provided right below the sliding groove 241, wherein a drain pore 244 is provided on a bottom wall of the sliding groove 241. In use, the condensed water may drip from a periphery rim of the lid 1 onto the sliding seat 240, and flow into the sliding groove 241 and may be collected by the water collection box 243 via the drain pore 244. As such, the sliding groove 241 can also be referred to as the guiding gutter 241.

In some embodiments, the at least one latch slot 25 is provided in the form of a perforated slot or through slot, wherein the corresponding at least one latch bar 15 may be constructed and arranged to have a traverse length that is longer than a depth of the at least one latch slot 25, so that the lid 1 can be secured more reliably. The at least one latch bar 15 may be shaped and sized to have a cross-section that is substantially in conformity with that of the at least one latch slot 25, so that the at least one latch bar 15 fits into the at least one latch slot 25 in a substantially gap free manner, thereby minimizing movement of the lid 1 after being secured to the latch slot 25.

Figure 3:
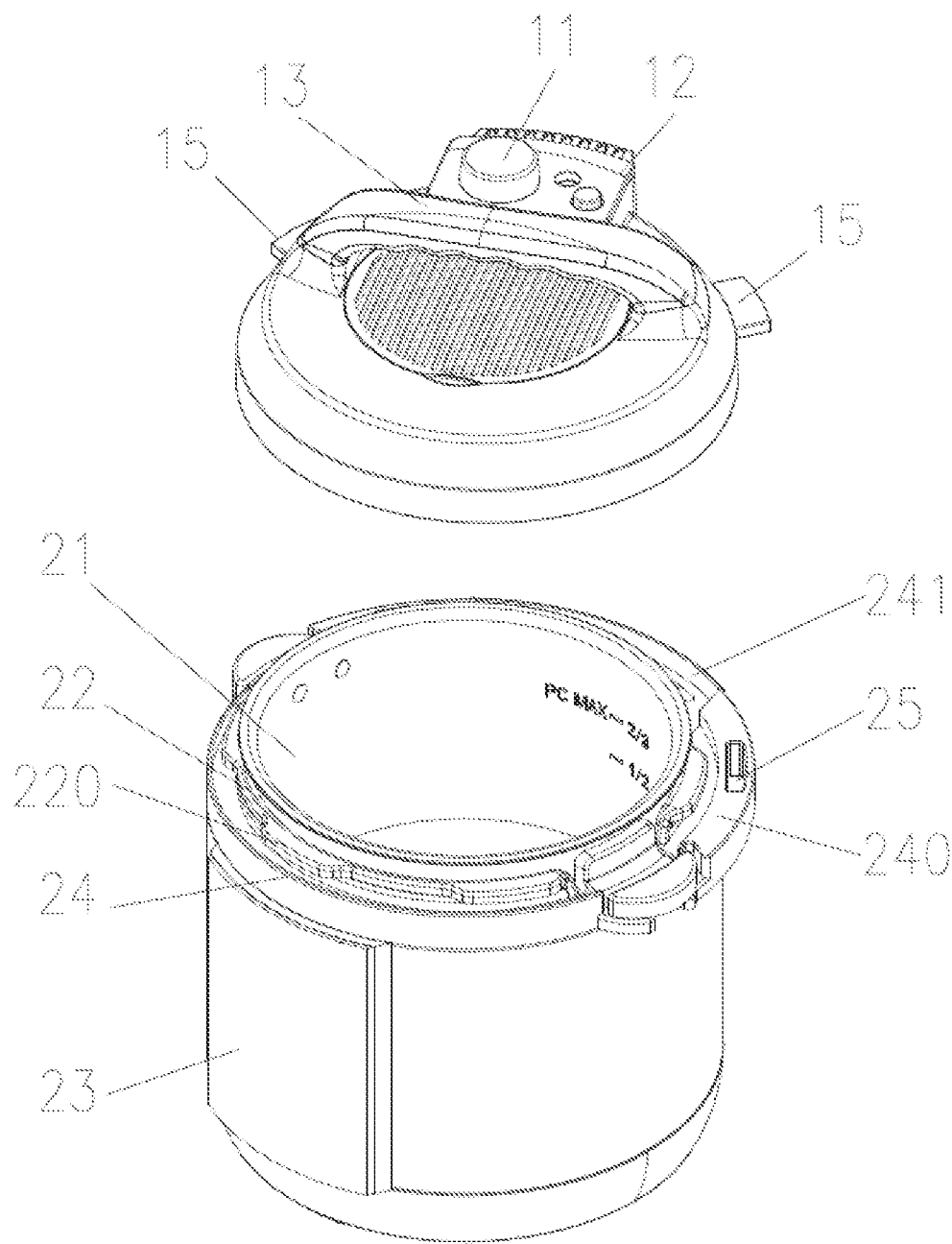
FIG. 3 is a perspective view showing the cooking appliance of FIG. 1 having a lid and a cooker body shown in separation.
Figure 6:
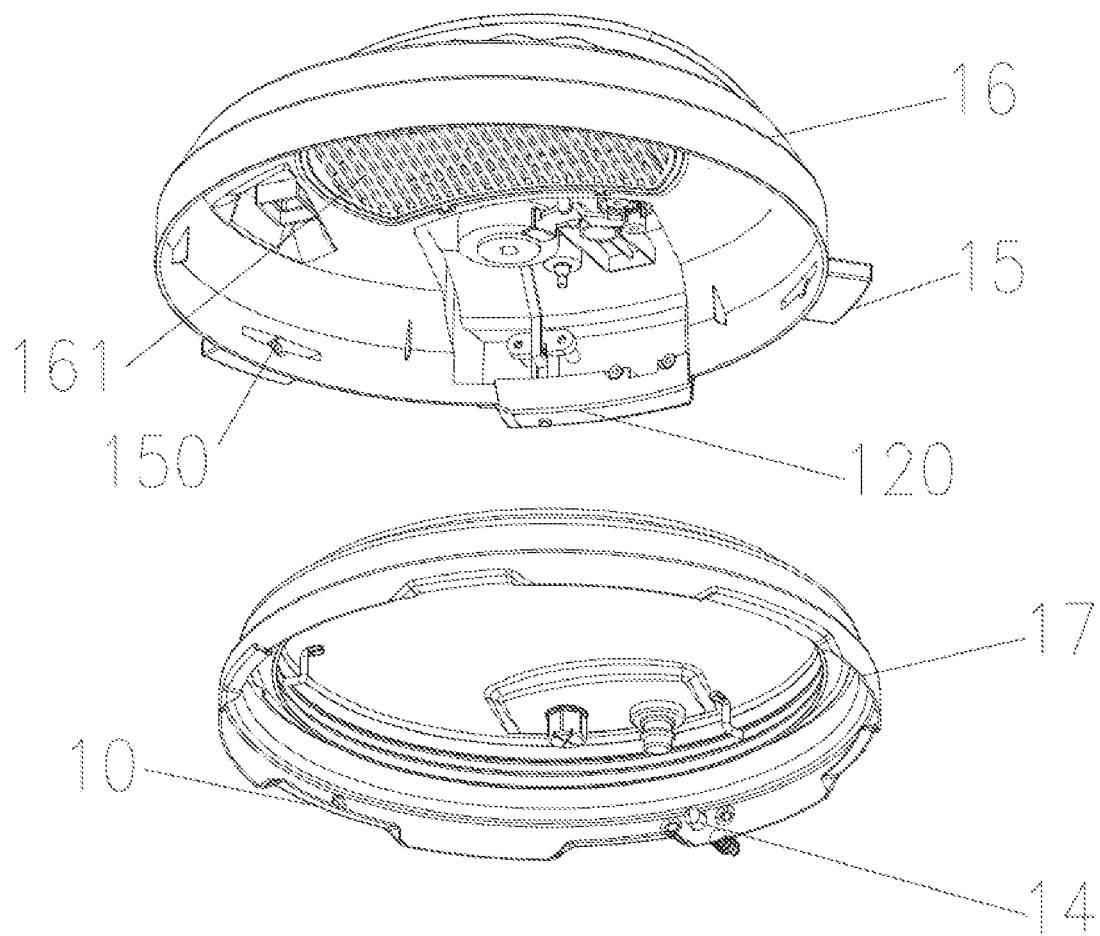
FIG. 6 is a perspective exploded view of the lid of the cooking appliance of FIG. 1.

In some embodiments, the at least one latch slot 25 is located outside of the guiding gutter 241, and being formed by way of a downward recess extending from a surface of the sliding seat 240, i.e., the surface of the sliding seat 240 becomes a top surface of the at least one latch slot 25. Thus, the top surface of the at least one latch slot 25 is elevated from the guiding gutter 241, thereby avoiding a flow of water into the at least one latch slot 25. Referring to FIGS. 3 and 4, and with reference to FIG. 6, the lid 1 comprises an upper lid portion 16 and a lower lid portion 17, wherein the upper lid portion 16 is formed by way of injection molding of plastic materials, wherein the lower lid portion 17 is substantially made of stainless steel, and comprises a plurality of inwardly extending lid teeth 10 formed along a periphery rim of the lower lid portion 17. The mounting seat 12 and the at least one latch bar 15 are integrally formed with the upper lid portion 16. The sliding member 120 of the mounting seat 12 extends downwardly beyond a bottom rim of the lid 1, wherein the at least one latch bar 15 comprises a hollow portion having one or more reinforcing ribs 150 disposed therein. As noted earlier, in some embodiments, the cooking appliance further comprises an opening-stop mechanism 14, the opening-stop mechanism 14 being disposed near a periphery rim of the lower lid portion 17 and outwardly extending therefrom. The sliding seat 240 of the cooker body 2 comprises a stopper groove (not shown) disposed thereon, wherein the opening-stop device 14 is operable to be pressed into the stopper groove to prevent the lid 1 from rotating relative to the cooker body 2, thereby preventing the lid from being opened during cooking and avoiding scald injuries caused by hot food spurting due to the high pressure in the cooking chamber. The lower lid portion 17 may further comprise a block-prevention cover and/or other conventional components, the detailed description of which will be omitted herein.

Referring to FIG. 5, the upper lid portion 16 comprises a main lid body 160 and a removable cover 161, wherein the main lid body 160 is substantially annular-shaped, and has a substantially centrally disposed opening portion (not numbered) extending through a top wall of the main lid body 160, and wherein the removable cover 161 is constructed and arranged to be removably attachable to the opening portion. When the cooking process is completed, the removable cover 161 can be detached to expose the lower lid portion 17 thereunder, which is a top wall of the cooking chamber, thereby facilitating the cooling of the cooking chamber. Alternatively, cold towels and/or ice bags can be placed at the opening portion to help with the rapid cooling of the cooking chamber so as to allow the cooked food to be enjoyed sooner.

In some embodiments, a handle portion 162 is formed at a front side rim of the removable cover 161, wherein the handle portion 162 is oriented angularly upward relative to a main plane of the removable cover 161 for allowing a user to manually lift the removable cover 161. In use, a user can move the handle portion 162 upwardly to easily detach the removable cover 161 from the main lid body 160, to start rapid cooling of the cooking chamber.

In some embodiments, the cooker body 2 comprises a pair of cooker handles 26 for carrying the cooking appliance, wherein the sliding seat 240 is constructed and arranged to occupy substantially all space extending between the pair of cooker handles 26, thereby providing strengthened support for the lid 1. The cooker body 2 further comprises a display device 27 disposed on a front sidewall thereof, for controlling the cooking programs and/or operations.

Advantageously, by providing the at least one latch slot 25 near a periphery portion of the cooker body 2, the cooking appliance in accordance with the present disclosure allows the at least one latch bar 15 of the lid 1 to be inserted into the at least one latch slot 25 in a rearwardly tilted/inclined orientation, thereby avoiding scald injuries caused by the lid 1 during placement of the lid 1 and/or while accessing the food.

Figure 9:
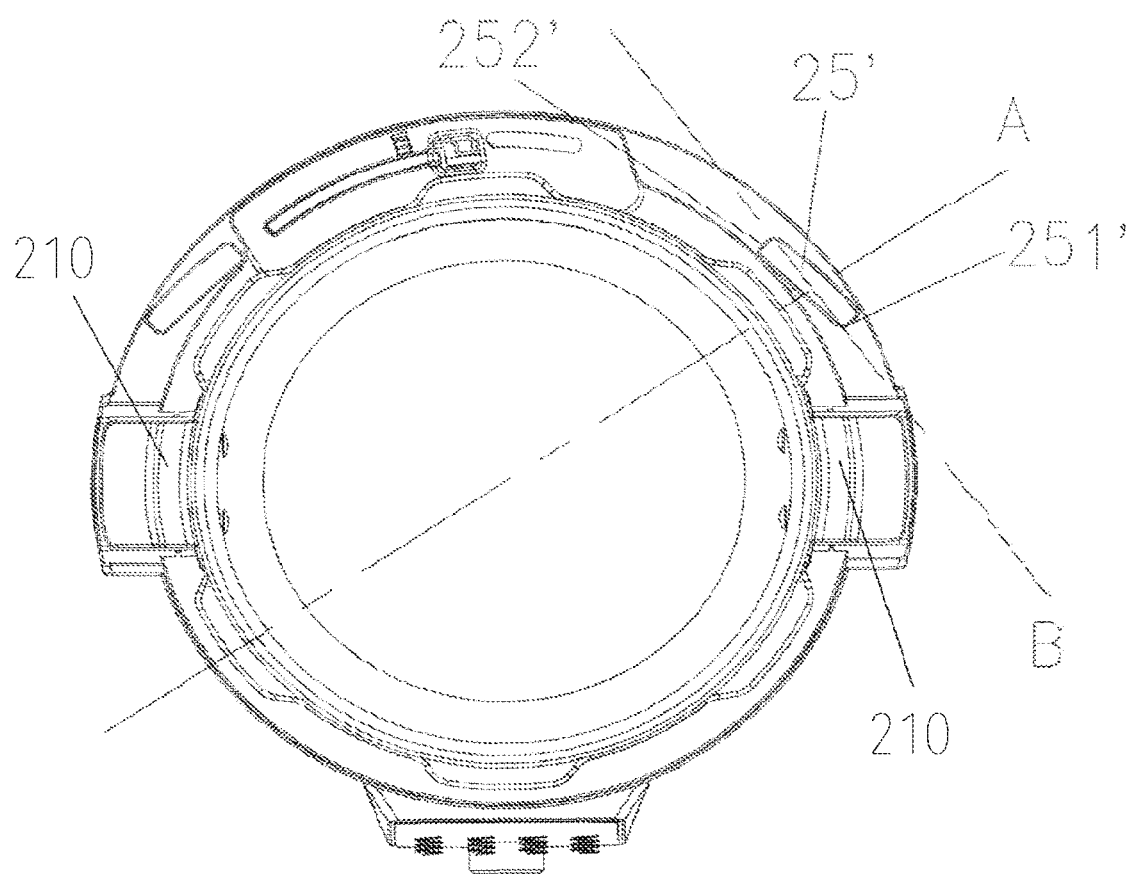
FIG. 9 is a top view illustrating a cooker body of a cooking appliance in accordance with another example embodiment of the present disclosure.

Referring to FIG. 9, in some embodiments, the at least one latch bar 15 and the at least one latch slot 25 each has a respective central line extending in a tangential direction of the lid 1 and the cooker body 2, respectively, wherein the at least one latch bar 15 and the at least one latch slot 25 each has a respective central point that is a tangent point of the lid 1 and the cooker body 2, respectively. Here, line A is defined as a line connecting a central point of the cooker body 2 and a central point of the at least one latch slot 25; and line B is defined as a central line of the at least one latch slot 25 extending in a tangential direction of the cooker body 2.

As noted earlier, when securing the lid 1 onto the cooker body 2, the lid 1 should not interfere with the normal handling or operations of the inner pot 21. In this regard, the present disclosure provides further improvements to the aforementioned embodiments of the cooking appliance. One of the solutions involves changing the previous orientation of the lid 1 relative to the cooker body 2. In these improved embodiments, when the lid 1 is secured to the cooker body 2, the lid 1 has an orientation that pivots slightly relative to the previous orientation of the lid 1, in that a front portion of the lid 1 pivots rearward and is positioned to be further away from the cooker body 2, while a rear portion of the lid 1 pivots forward and is positioned closer to the cooker body 2, so as to bring the front portion of the lid 1 to a suitable position that is sufficiently spaced apart from the pot handle 210. There are at least two options for reaching this goal: one option is to modify the position or configuration of the at least one latch slot 25, another option is to modify the position or configuration of the at least one latch bar 15.

Still referring to FIG. 9, wherein line A and line B are labeled, in some embodiments, the at least one latch slot 25' has a width in a circumferential direction of the cooker body 2. In FIG. 9, line B represents a central line of the at least one latch slot 25' prior to its rotational modification. Take the latch slot 25' on the right side as an example, a modified configuration can be obtained by rotating the latch slot 25' about a central point thereof in a counterclockwise direction by a predetermined angle such that, in a circumferential direction of the cooker body 2, a front side 251' of the latch slot 25' is positioned to be further away from a center of the cooker body 2 than a rear side 252' of the latch slot 25'. The at least one latch bar 15 remains unmodified, and is being horizontally disposed along a tangential line of the lid 1, wherein when the latch bar 15 is rotated upwardly about a central point thereof from a horizontal orientation to a vertical orientation, a front side of the latch bar 15 and a circumferentially spaced apart rear side thereof are substantially equidistant from a center of the cooker body 2. Thus, in order to insert the right side latch bar 15 into the right side latch slot 25', it is necessary to rotate the lid 1 in a counterclockwise direction about a central point of the latch bar 15 by a predetermined angle so that a front portion of the lid pivots backwards away from the cooker body, while a rear portion of the lid 1 pivots towards the cooker body, thereby moving the front portion of the lid rearward and thus allowing a user to avoid accidentally contacting the lid when operating the cooking appliance at a front side thereof.

It is to be understood that, in such modified configuration, the left side latch slot 25' will be rotated about a central point thereof in a clockwise direction by a predetermined angle such that, in a circumferential direction of the cooker body 2, a front side 251' of the latch slot 25' is positioned to be further away from a center of the cooker body 2 than a rear side 252' of the latch slot 25'.

Figure 10:
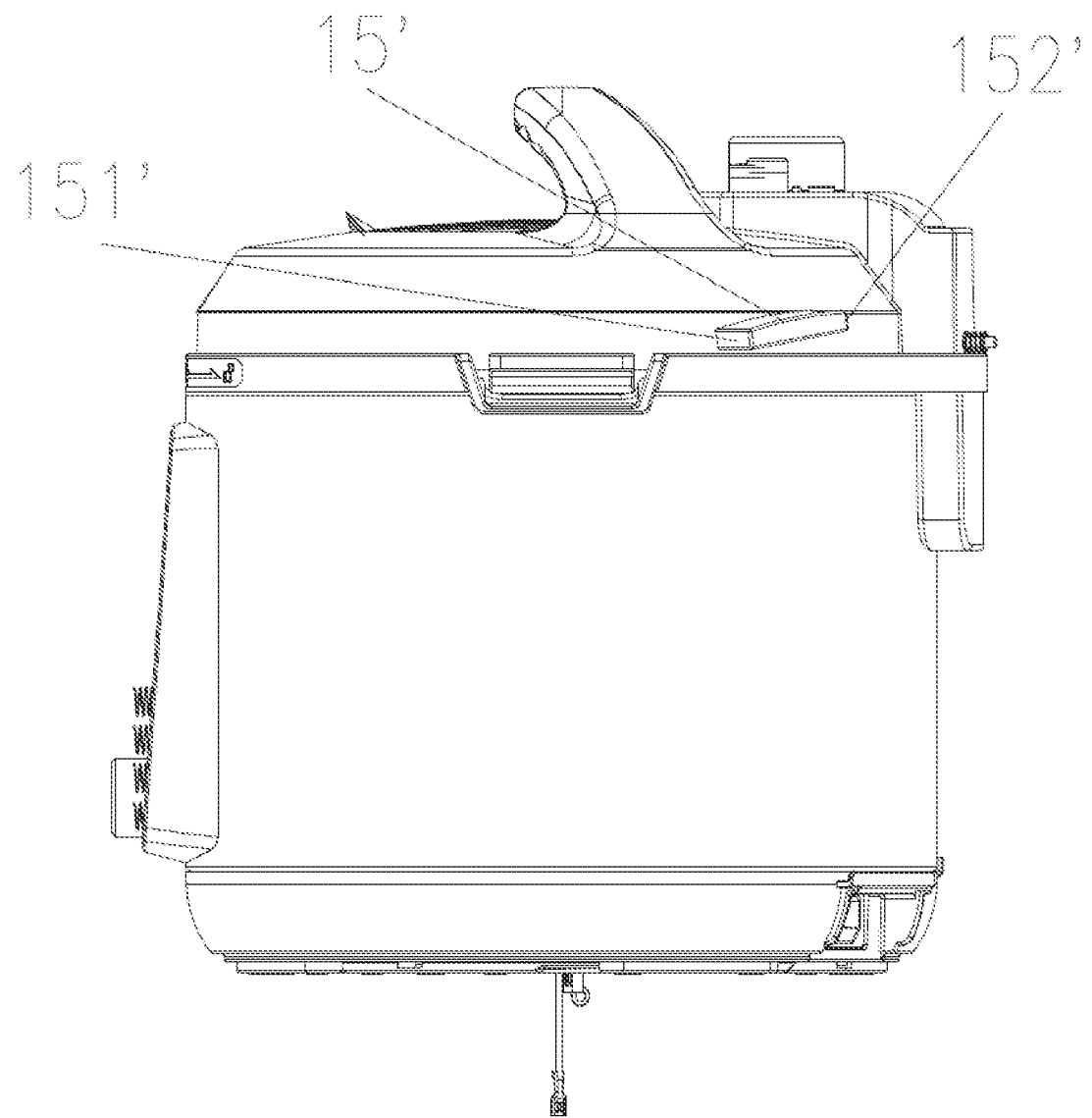
FIG. 10 is a side view illustrating a cooking appliance in accordance with another example embodiment of the present disclosure.
Figure 11:
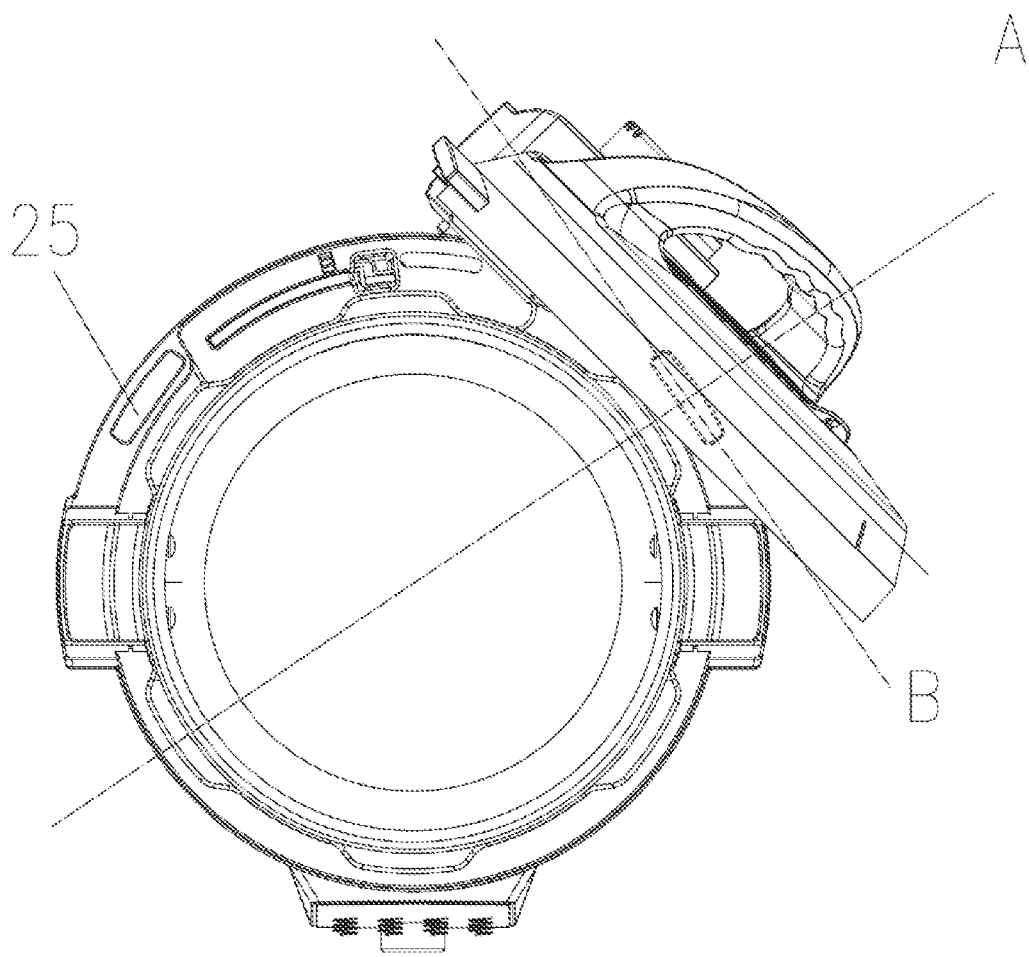
FIG. 11 is a top view of the cooking appliance of FIG. 10 shown in another configuration.

Referring to FIGS. 10 and 11, wherein line A and line B are labeled, this example embodiment is similar to the embodiment of FIG. 9, with the difference that the configuration of the at least one latch bar 15 is being modified, while the at least one latch slot 25 remains unmodified and being disposed along a tangential line of the cooker body 2. Viewing a horizontally oriented lid 1, the at least one latch bar 15' has a width in a circumferential direction of the lid 1, wherein in the circumferential direction, a front side 151' of the latch bar 15' is positioned to be lower than a rear side 152' of the latch bar 15', namely, the at least one latch bar 15' is inclinedly disposed on a sidewall of the lid 1, wherein the inclination angle is about 10 degree. In other words, when rotating the lid 1 upwardly about a central point of the at least one latch bar 15' from a horizontal orientation to a vertical orientation, wherein the lid 1 is oriented to be substantially parallel with line B of FIG. 11, the front side 151' of the latch bar 15' is closer to the center of the cooker body than the rear side 152' of the latch bar 15'.

Since a front side of the latch slot 25 and a circumferentially spaced apart rear side thereof are substantially equidistant from the center of the cooker body 2, in order to insert the latch bar 15' into the latch slot 25, it is necessary to rotate the lid 1 in a counterclockwise direction about a central point of the latch bar 15' by a predetermined angle so that a front portion of the lid pivots backwards away from the cooker body, while a rear portion of the lid 1 pivots towards the cooker body, thereby moving the front portion of the lid rearward and thus allowing a user to avoid accidentally contacting the lid when operating the cooking appliance at a front side thereof. The feature shown in stippled line in FIG. 11 represents the latch slot 25 disposed on the right side, which can be understood to represent the ultimate position where the right side latch bar 15' should be placed for insertion.

Figure 12:
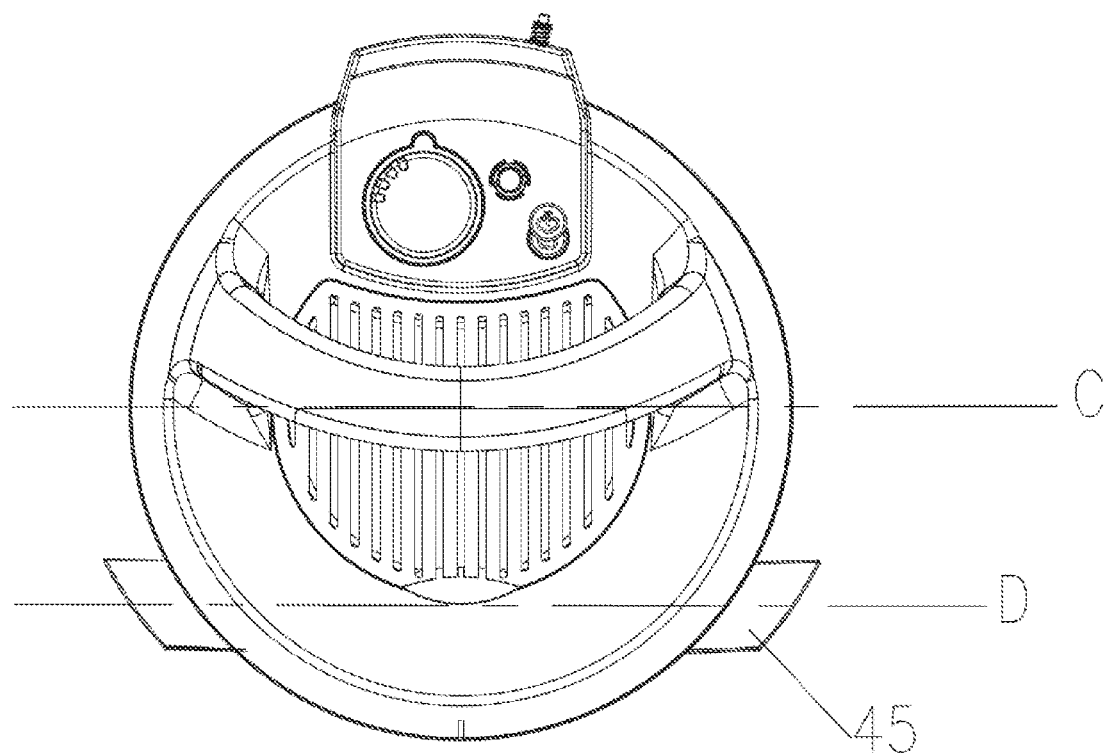
FIG. 12 is a top view illustrating a cooking appliance in accordance with another example embodiment of the present disclosure.
Figure 13:
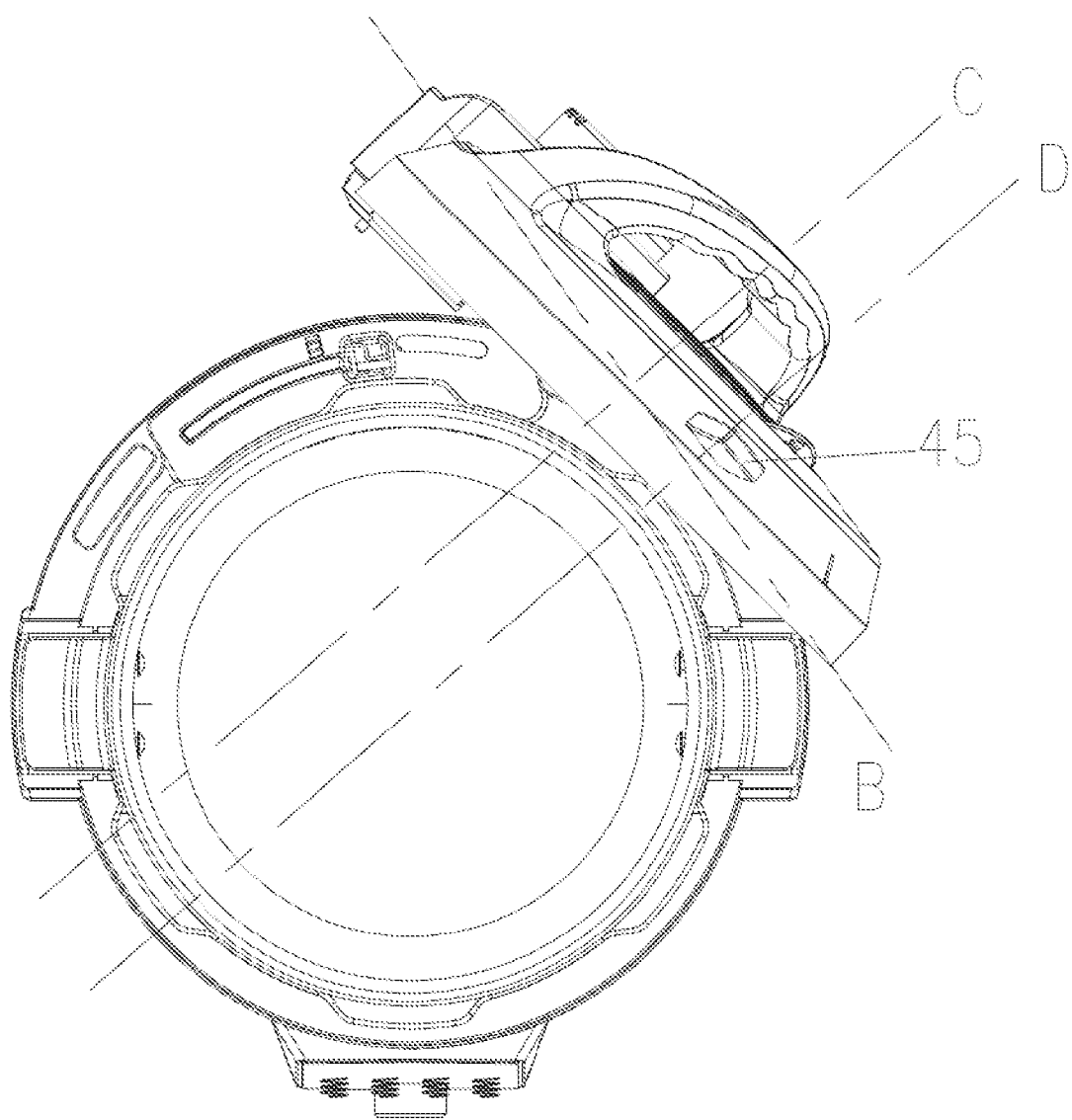
FIG. 13 is a top view of the lid of the cooking appliance of FIG. 12.

In addition to the pivoting movements of the lid, other solutions are possible, for example, by way of a rearward translation movement of the lid relative to the cooker body. Referring to FIGS. 12 and 13, in some embodiments, the at least one latch bar 45 is disposed at a front portion of the lid, wherein the at least one latch bar 45 is positioned such that a central line thereof is in front of the center of the lid. In FIGS. 12 and 13, line C delineates a front portion and a rear portion of the lid, wherein by a counterclockwise rotation this line C may align with a central point of the at least one latch slot 25. Line D represents a central line of the at least one latch bar 45. It can be understood that the central line D defines an installation line extending through a connection point between the lid and the cooker body, and that the installation line D does not go through the center of the lid; rather, it is disposed in front of the center of the lid.

The example embodiments of FIGS. 12 and 13 differ from the previously discussed embodiments. In the previous embodiments, the at least one latch bar 15 and the at least latch slot 25 are both disposed at rear portions of the lid and the cooker body, respectively, and are both disposed on tangential lines of the lid and the cooker body, respectively. As such, a central line of the lid is also an installation line for the at least one latch bar 15 and the at least latch slot 25. However, embodiments of FIGS. 12 and 13 are different because the at least one latch bar 45 is now disposed in front of the center of the lid, and not tangentially disposed at the rear portion of the lid. Take as an example the fitting between the right side latch bar 45 and the right side latch slot 25 when the lid is rotated into a position for placement onto the cooker body. As the central line C of the lid is now located to the rear left of the installation line D of the right side latch bar, in order to insert the right side latch bar 45 into the right side latch slot 25, it is necessary to move the lid as a whole toward rear left along the direction of line B, namely, line D is moved to the previous location of line C as a result of the translation movement of the lid. This means that the intersection of line B and line D is the central point of the right side latch slot 25. As such, the lid is secured closer to the rear portion of the cooker body, and the front side of the lid is moved towards a rear left direction, thereby allowing a user to avoid accidentally contacting the lid when operating the cooking appliance at a front side thereof. For ease of understanding, reference can also be made to the lid position shown in FIG. 10, which roughly represents a lid position before lid placement movement. In theory, similarly methods can be applied to relocate the at least one latch slot 25. However, moving the at least one latch slot 25 rearward may result in inconvenience to the users of the cooking appliance. The terms used in the present application are for the purpose of describing particular embodiments only, and are not intended to limit the present application. As used herein and in the appended claims, the singular forms "a", "an", and "the" are intended to include the plural forms unless the context clearly dictates otherwise. It should also be understood that, as used herein, the term "and/or" refers to and includes any or all possible combinations of one or more of the associated listed items.

The foregoing is only preferred embodiments of the present application only, and is not intended to limit the present application. Any modifications, equivalent substitutions, improvements, etc., which are made within the spirit and principles of the present application should be included within the scope of protection of the present application.

The invention claimed is:

1. A cooking appliance comprising:
 a cooker body for receiving food to be cooked, the cooker body comprising a user interface on a front side thereof for controlling cooking operations, with a rear side spaced apart from the front side, a vertically extending central axis, and at least one latch slot disposed on the rear side of the cooker body; and,
 a lid for covering the cooker body, the lid comprising at least one latch bar disposed on a periphery thereof and extending outward therefrom;
 wherein when the lid is detached from the cooker body and the at least one latch bar is inserted into the at least one latch slot, the lid is angled in an outwardly inclined manner relative to the central axis.

2. The cooking appliance of claim 1, wherein each latch bar of the at least one latch bar comprises a surface angled relative to a horizontal direction perpendicular to the vertically extending axis.

3. The cooking appliance of claim 1, wherein the latch bar is angled relative to a horizontal direction perpendicular to the vertically extending axis.

4. The cooking appliance of claim 1, wherein each latch slot of the at least one latch slot extends in the vertical direction and comprises a surface angled outward relative to the vertical direction.

5. The cooking appliance of claim 1, wherein each latch slot of the at least one latch slot is angled outward relative to the vertical direction.

6. The cooking appliance of claim 1, wherein a central line of the at least one latch bar is positioned in front of a center of the lid, so that when the lid is secured to a latch slot of the at least one latch slot by way of insertion operation, the lid is positioned toward the rear side of the latch slot.

7. The cooking appliance of claim 1, wherein:
the cooking appliance is an electric pressure cooker;
the lid is constructed and arranged to rotate relative to the cooker body between a lid lock position and a lid open position; and,
the at least one latch bar is disposed at a position on the lid, so that when the lid is at the lid open position, the at least one latch bar is substantially aligned with the corresponding at least one latch slot disposed on the cooker body.

8. A cooking appliance comprising:
a cooker body for receiving food to be cooked, the cooker body comprising a user interface on a front side thereof for controlling cooking operations, with a rear side spaced apart from the front side, and at least one latch slot disposed on the rear side of the cooker body, and;
a lid for covering the cooker body, the lid comprising at least one latch bar disposed on a periphery thereof and extending outward therefrom;
wherein when the lid is detached from the cooker body and the at least one latch bar is inserted into the at least one latch slot, a front side of the lid is angled outwardly relative to a line tangent to the cooker body extending through a center point of the latch slot and a center point of the latch bar.

9. The cooking appliance of claim 8, wherein each latch bar of the at least one latch bar extends in a circumferential direction of the lid, and wherein in the circumferential direction, a front side of the latch bar is positioned to be lower than a rear side of the latch bar.

10. The cooking appliance of claim 8, wherein each latch slot of the at least one latch slot extends in a circumferential direction of the cooker body, and wherein in the circumferential direction, a front side of the latch slot is positioned to be further away from a center of the cooker body than a rear side of the latch slot.

11. The cooking appliance of claim 8, wherein a central line of the at least one latch bar is positioned in front of a center of the lid, so that when the lid is secured to a latch slot of the at least one latch slot by way of insertion operation, the lid is positioned toward the rear side of the latch slot.

12. The cooking appliance of claim 8, wherein:
the cooking appliance is an electric pressure cooker;
the lid is constructed and arranged to rotate relative to the cooker body between a lid lock position and a lid open position; and,
the at least one latch bar is disposed at a position on the lid, so that when the lid is at the lid open position, the at least one latch bar is substantially aligned with the corresponding at least one latch slot disposed on the cooker body.

13. A cooking appliance comprising:
a cooker body for receiving food to be cooked, the cooker body comprising a user interface on a front side thereof for controlling cooking operations, with a rear side spaced apart from the front side, and at least one latch slot disposed on the rear side of the cooker body, and;
a lid for covering the cooker body, the lid being rotatable relative to the cooker body between a lid lock position and a lid open position, the lid comprising at least one latch bar disposed on a periphery thereof and extending outward therefrom;
wherein the at least one latch bar is disposed at a position on the lid, so that when the lid is at the lid open position, a latch bar of the at least one latch bar is substantially aligned with a latch slot of the at least one latch slot disposed on the rear side of the cooker body.

14. The cooking appliance of claim 13, wherein when the lid is detached from the cooker body and the at least one latch bar is inserted into the at least one latch slot, the lid is angled in an outwardly inclined manner relative to a central axis of the cooker body.

15. The cooking appliance of claim 13, wherein when the lid is detached from the cooker body and the at least one latch bar is inserted into the at least one latch slot, a front side of the lid is angled outwardly relative to a line tangent to the cooker body extending through a center point of the latch slot and a center point of the latch bar.

16. The cooking appliance of claim 13, wherein a central line of the at least one latch bar is positioned in front of a center of the lid, so that when the lid is secured to a latch slot of the at least one latch slot by way of insertion operation, the lid is positioned toward the rear side of the latch slot.

17. The cooking appliance of claim 13, wherein the latch bar is angled relative to a horizontal direction perpendicular to a vertically extending axis of the cooker body.

18. The cooking appliance of claim 13, wherein each latch slot of the at least one latch slot is angled outward relative to a vertically extending axis of the cooker body.

19. The cooking appliance of claim 13, wherein each latch bar of the at least one latch bar extends in a circumferential direction of the lid, and wherein in the circumferential direction, a front side of the latch bar is positioned to be lower than a rear side of the latch bar.

20. The cooking appliance of claim 13, wherein each latch slot of the at least one latch slot extends in a circumferential direction of the cooker body, and wherein in the circumferential direction, a front side of the latch slot is positioned to be further away from a center of the cooker body than a rear side of the latch slot.

* * * * *